US008572170B2

(12) United States Patent
Shaffer et al.

(10) Patent No.: US 8,572,170 B2
(45) Date of Patent: Oct. 29, 2013

(54) SYSTEM AND METHOD FOR LEAVING AND RETRIEVING ELECTRONIC MESSAGE NOTES

(75) Inventors: Shmuel Shaffer, Palo Alto, CA (US); Labhesh Patel, San Francisco, CA (US); Joseph Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 806 days.

(21) Appl. No.: 12/030,877

(22) Filed: Feb. 14, 2008

(65) Prior Publication Data

US 2009/0210496 A1    Aug. 20, 2009

(51) Int. Cl.
*G06F 15/16* (2006.01)

(52) U.S. Cl.
USPC ........ 709/204; 709/205; 709/206; 379/88.12; 379/88.13; 379/88.14; 379/88.15; 379/88.16

(58) Field of Classification Search
USPC ...................... 709/202–206; 379/88.12–88.16
See application file for complete search history.

(56) References Cited

U.S. PATENT DOCUMENTS

| 7,567,662 | B1* | 7/2009 | Renner et al. | 379/202.01 |
|---|---|---|---|---|
| 2007/0019798 | A1* | 1/2007 | Voight et al. | 379/202.01 |
| 2007/0130277 | A1* | 6/2007 | Roskind et al. | 709/207 |
| 2007/0143435 | A1* | 6/2007 | Daigle et al. | 709/207 |
| 2007/0162553 | A1* | 7/2007 | Dewing et al. | 709/207 |
| 2007/0203995 | A1* | 8/2007 | Wang et al. | 709/206 |
| 2008/0084831 | A1* | 4/2008 | Sylvain | 370/260 |
| 2008/0159490 | A1* | 7/2008 | Gaudin et al. | 379/88.16 |
| 2009/0077191 | A1* | 3/2009 | Bristow et al. | 709/207 |
| 2010/0027775 | A1* | 2/2010 | I'Anson | 379/202.01 |

\* cited by examiner

*Primary Examiner* — Duyen Doan
(74) *Attorney, Agent, or Firm* — P. Su

(57) ABSTRACT

Methods and apparatus for allowing a message to be left for an expected user of a network application are disclosed. According to one embodiment, a method includes determining when a first user has requested access to a first application, and determining if there is a message for the first user when it is determined that the first user has requested access to the first application. The method also includes informing the first user of the message if it is determined that there is the message for the first user, as well as providing the first user with access to the first application after informing the first user of the message and after the first user acknowledges that the first user has been informed of the message.

31 Claims, 9 Drawing Sheets

SYSTEM AND METHOD FOR LEAVING AND RETRIEVING ELECTRONIC MESSAGE NOTES

BACKGROUND OF THE INVENTION

The present invention relates generally to networks.

Typically, when a first individual wishes to provide information to a second individual and the first individual is unable to establish immediate contact with the second individual, the first individual may leave a message for the second individual. Such a message may be a voicemail, an e-mail, an instant message, or a physical note left at a location associated with the second individual. While the second individual will generally eventually access the message, the second individual may not necessarily become aware of the message promptly, e.g., before the contents of the message become irrelevant or outdated. By way of example, if the first individual leaves a message to inform the second individual that the second individual's participation in a conference is no longer necessary, the second individual may not necessarily become aware of the message until after the second individual has already joined the conference.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

In one embodiment, a method includes determining when a first user has requested access to a first application, and determining if there is a message for the first user when it is determined that the first user has requested access to the first application. The method also includes informing the first user of the message if it is determined that there is the message for the first user, as well as providing the first user with access to the first application after informing the first user of the message and after the first user acknowledges that the first user has been informed of the message.

DESCRIPTION

The integration of a messaging system and other systems, e.g., video or audio conferencing systems, provides the ability for a first user to leave a message for a second user such that the message may be presented to the second user when the second user access any of the other systems. That is, a first user is provided with the ability to leave, e.g., record, a message for a second or target user that may be presented to the second user when the second user accesses a system. By way of example, a message originator may record a message for an anticipated conference participant such that when the anticipated conference participant dials into a conference bridge to join a conference, the message is played for the anticipated conference participant before he or she is actually connected to the conference.

The ability to leave a message in a system such as a conference system enables information to be shared efficiently, and in a timely manner. If the message pertains to information that is intended to be conveyed to a participant before a conference, leaving the message on a conference bridge essentially ensures that the participant will be made aware of the message before the participant joins the conference. That is, if a first person wishes to share some pertinent information with a second person before the second person joins a conference, the first person may leave a message for the second person on a conference bridge. Hence, when the second person attempts to join a conference, the second person may retrieve the message.

It should be appreciated that a conference may generally be any multimedia conference session. Multimedia conference sessions typically include, but are not limited to including, video conferences, voice conferences, chats, and the like.

In one embodiment, a first person may leave a message for a second person relative to an overall system or network. That is, a first person may leave a message for a second person such that regardless of which application within an overall network the second person attempts to utilize, the second person may be notified of the existence of the message.

Figure 1A:
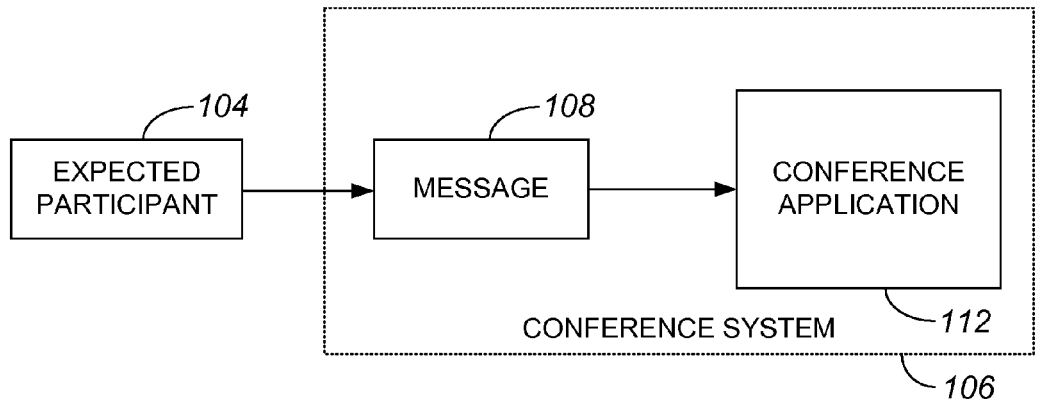
FIG. 1A is a block diagram representation of a system in which a participant or a message recipient is presented with a message before being allowed to access a conference application in accordance with an embodiment of the present invention.

Referring initially to FIG. 1A, an overall system in which a participant or a message recipient is presented with a message before being allowed to access a conference application in accordance with an embodiment of the present invention. A conference system 106 may be accessed, as for example through a network, by a target user or expected participant 104. Expected participant 104 may be an individual who is expected to participate in a particular conference, e.g., an individual who has been invited to join a conference bridge.

When expected participant 104 attempts to access a conference application 112 associated with conference system 106, if there is a message 108 intended for expected participant 104 present within conference system 106, expected participant 104 may effectively be required to obtain message 108 prior to being allowed to access conference application 112. That is, expected participant 104 may be substantially prevented from joining a conference using conference application 112 unless he or she obtains message 108. It should be appreciated, however, that some conference system 106 may be such that expected participant 104 may be allowed to access conference application 112 as long as expected participant 104 is made aware of the existence of message 108. In one embodiment, message 108 includes information that is intended substantially only for expected participant 104.

Figure 1B:
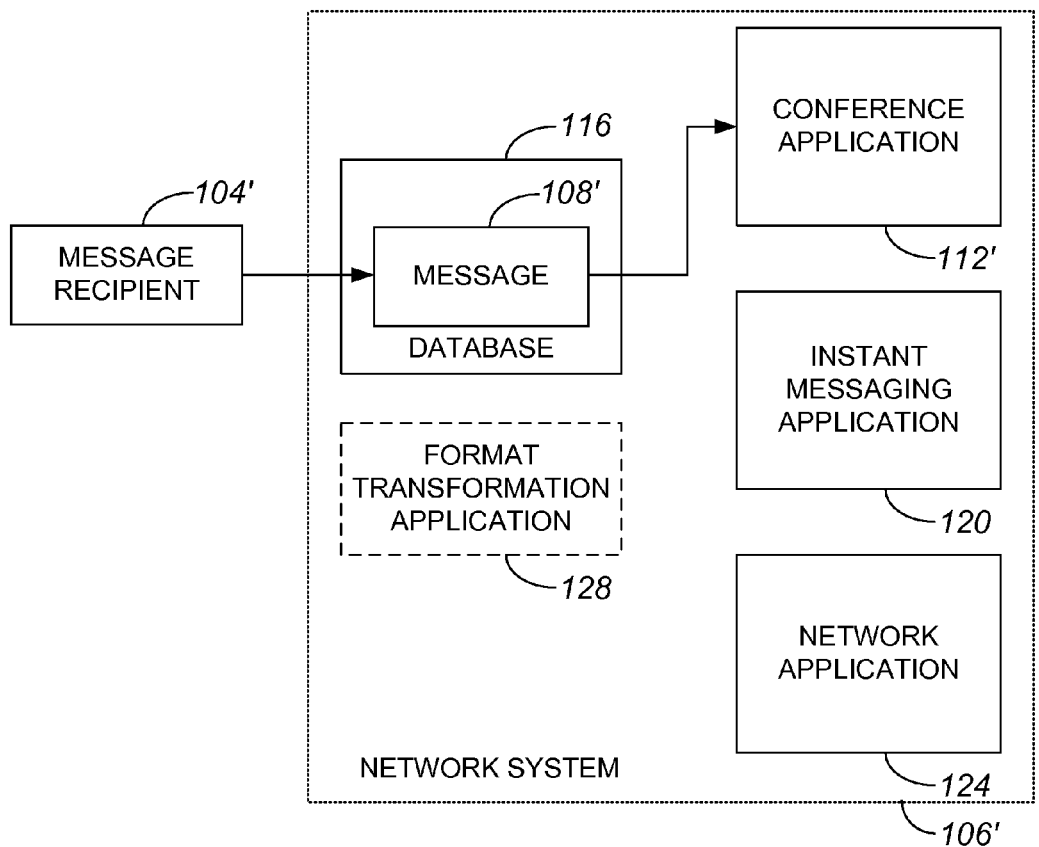
FIG. 1B is a block diagram representation of a system in which a message recipient is presented with a message prior to being allowed to access applications in a network in accordance with an embodiment of the present invention.

As previously mentioned, a message may be left with respect to an overall system such that a message recipient is presented with the message before being allowed to access any applications or resources associated with the overall system. In other words, a message left in a network system may be presented to a user regardless of which application or resource within the network system the message recipient attempts to access. FIG. 1B is a block diagram representation of a system in which a message recipient is presented with a message prior to being allowed to access a network in accordance with an embodiment of the present invention. A network system 106' may include a number of applications. Applications may generally include, but are not limited to including, a conference application 112', an instant messaging application 120, and substantially any network application 124.

A message 108' that is intended for a message recipient 104' may be left within network system 106', and stored on a database 116 associated with network system 106'. Although database 116 is shown as a separate entity within network system 106', database 116 may instead be distributed throughout network system 106'. By way of example, database 116 may be distributed such that each application 112', 120, 124 effectively includes a portion of database 116.

In general, message 108' may be stored in substantially any format. Message 108' may be stored, for example, as a text file, a video file, and/or an audio file. Before message 108' may be presented to message recipient 104', message 108' may be rendered into a suitable format for an application 112', 120, 124 that message recipient 104' is requesting access to. For example, if message 108' is stored in a text format, message 108' may be rendered into an audio format if message 108' is to be presented with respect to conference application 112'. A format transformation application 128 is arranged to transform message 108', or otherwise render message 108', into different formats such that message 108' may be presented to message recipient 104' in an appropriate format. In one embodiment, format transformation application 128 may automatically transcode audio formats between various transcoding formats, e.g., G723 to G711. In another embodiment, format transformation application 128 may automatically transcode between various video encoding formats such as high definition TV (HDTV) and H.263.

When message recipient 104' effectively requests access to conference application 112', message recipient 104' is not allowed to access conference application 112' or, more specifically, a conference bridge associated with conference application 112', until after message recipient 104' is at least made aware of message 108'. In one embodiment, message recipient 104' may access conference application 112' substantially only after message recipient 104' is presented with message 108', or obtains the contents of message 108'. Similarly, message recipient 104' may be made aware of message 108' as soon as he or she attempts to access any other network application, e.g., application 120 or application 124.

Figure 2:
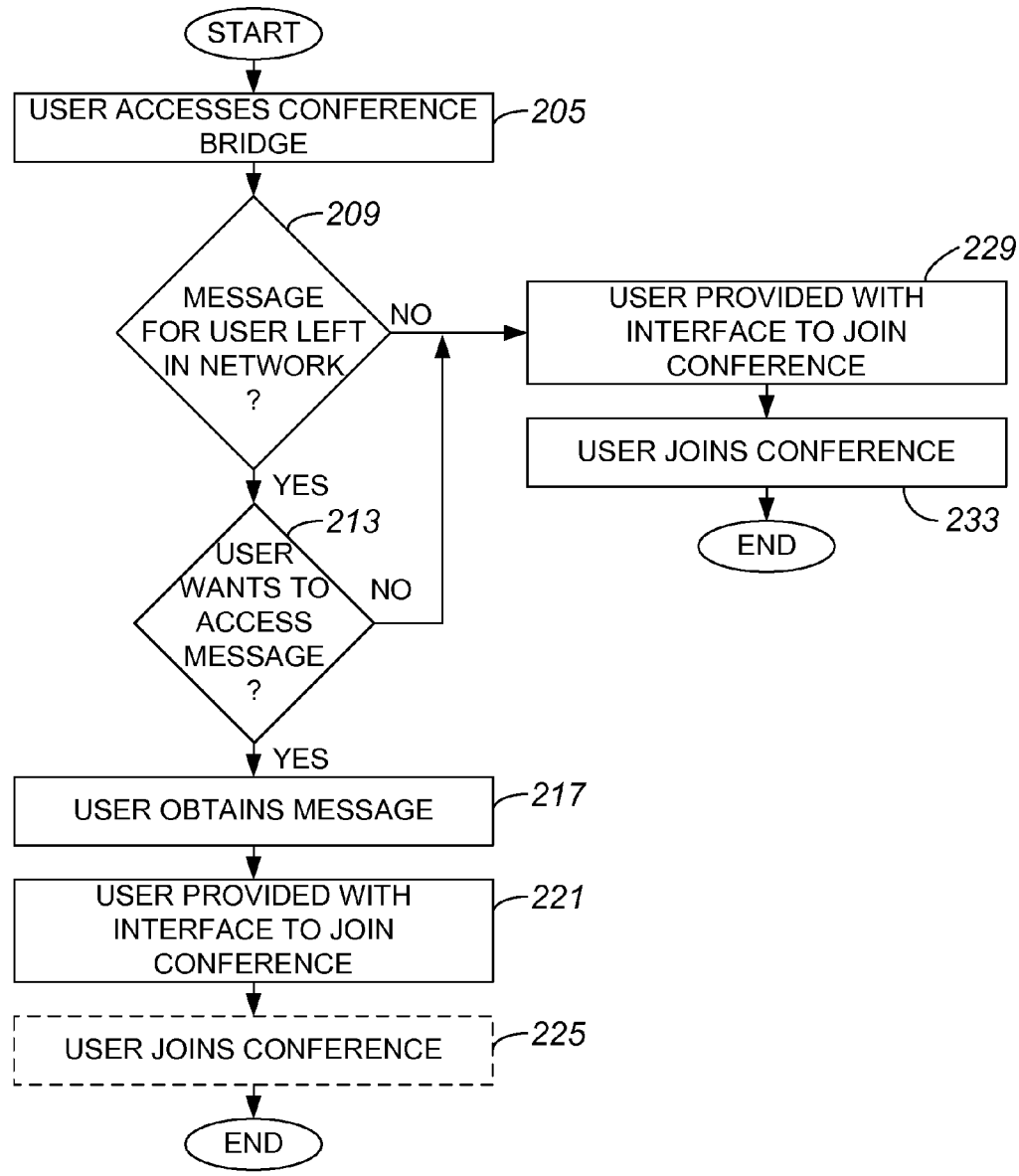
FIG. 2 is a process flow diagram which illustrates a method associated with a user joining a conference via a conference bridge in accordance with an embodiment of the present invention.

With reference to FIG. 2, a method of using a conference system from the point-of-view of a conference participant will be described in accordance with an embodiment of the present invention. A method 201 of using a conference system begins at step 205 in which a user accesses a conference bridge associated with a conference application. In one embodiment, a user may access a conference bridge by dialing into the conference bridge. Although a conference application is described, it should be appreciated that the application the user accesses is not limited to being a conference application.

Once the user accesses the conference bridge, a determination is made in step 209 as to whether a message intended for the user has been left in a network. That is, it is determined if the conference bridge effectively needs to inform the user that there is a message intended for the user. A user may generally be notified of a message using a variety of different methods. Such methods may include, but are not limited to including, providing the user with a communication which indicates the existence of a message and/or sounding a tone sequence that indicates that there is a message for the user.

If it is determined in step 209 that there is no message awaiting the user, then in step 229, the user is provided with an interface which allows the user to join a conference. Using the interface, the user may join a conference such as a multimedia conference, a voice conference, a videoconference, or an instant messaging chat session in step 233. Upon the user joining a conference, method 201 is completed.

Alternatively, if it is determined in step 209 that a message has been left for the user, a determination is made in step 213 as to whether the user wants to access the message. In the described embodiment, the user is provided with the ability to decide whether or not to access a message. It should be appreciated, however, that in some systems, a user may effectively be required to access any messages left for him or her in order to be provided with an interface to join a conference. That is, in some systems, a user may be prevented from joining a conference unless he or she listens to or views a message left for him or her.

If it is determined that the user does not want to access the message in step 213, process flow moves to step 229 in which the user is provided with an interface that enables the user to join a conference. It should be appreciated that a determination may be made that the user wants to access the message through an affirmative indication that he or she does not wish to access the message, e.g., the user may enter a keystroke which indicates that he or she does not wish to access the message. Alternatively, if it is determined that the user wants to access the message in step 213, the user obtains the message in step 217. Obtaining the message may include, but is not limited to including, listening to an audio message, viewing a video message, or reading a text message.

After the user obtains the message, the user is provided with an interface to join a conference in step 221. Then, in step 225, the user may optionally join a conference. For example, the user may elect not to join a conference if the message obtained in step 217 indicates that the presence of the user on a conference is no longer needed. Once the user is provided with an interface to join a conference, and optionally joins a conference, the process of using a conference system is completed.

Figure 3:
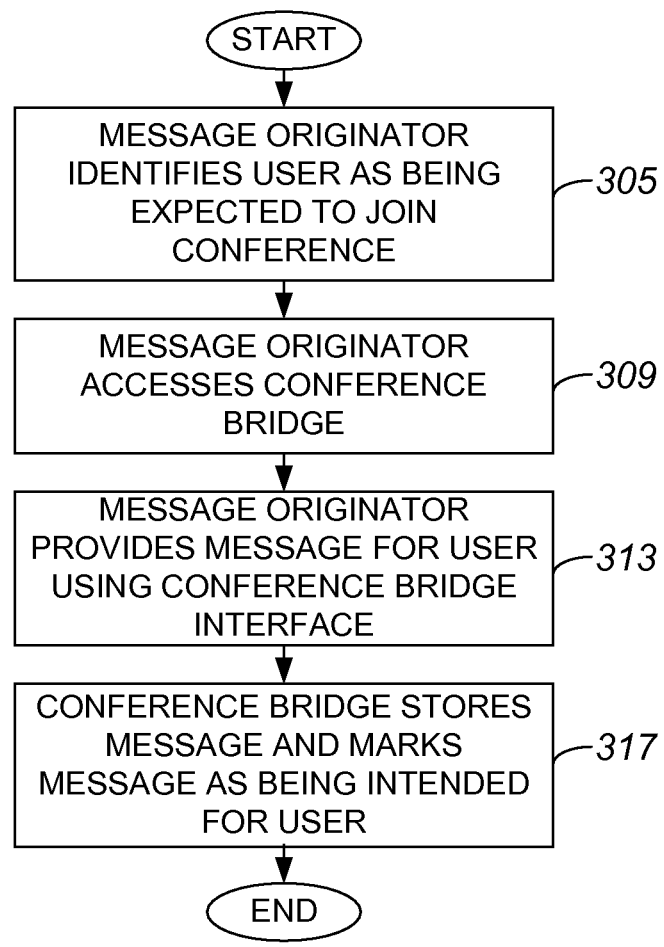
FIG. 3 is a process flow diagram which illustrates a method of leaving a message for a user who is expected to join a conference via a conference bridge in accordance with an embodiment of the present invention.

A message originator may leave a message for a user substantially directly in a conference application, e.g., on a conference bridge. FIG. 3 is a process flow diagram which illustrates a method of leaving a message for a user who is expected to join a conference via a conference bridge in accordance with an embodiment of the present invention.

Although a conference bridge application is discussed, it should be appreciated that a message for a user is not limited to being left with a conference bridge application. A process 301 of leaving a message for a user begins at step 305 in which a message originator, e.g., a person who wishes to leave a message, identifies a particular user as being expected to join a particular conference. The particular user may be identified, for instance, by studying a list of invitees to the particular conference.

After a message originator identifies a user as being expected to join a conference, the message originator accesses a conference bridge in step 309. Then, in step 313, the message originator provides a message for the user using an appropriate conference bridge interface. The conference bridge interface may take a variety of different formats. By way of example, the conference bridge interface may allow the message originator to record an audio-based message, may allow the message originator to record a video-based message, or may allow the message originator to input a text-based message. That is, the message originator may record the message or type the message.

In general, a message originator may need to specify the target user for whom the message is being provided. The conference bridge interface may provide a list of names, and allow the message originator to select a target user from the list of names or a list of potential conference participants. Alternatively, for security purposes, the conference bridge interface may instead prompt the message originator to input, e.g., key in or otherwise type, the name of the user. If the message originator is expected to input the name of the user, the message originator will typically have to be in possession of knowledge regarding a user identifier of the user.

Once the message originator provides the message for the user, the conference bridge stores the message, e.g., as a file, in step 317, and marks the message as being intended for the user. The conference bridge may generally store the message in a database, and may store information relating to the user along with the message to effectively mark the message as being associated with the user. The process of leaving a message for a user is completed upon the conference bridge storing the message and marking the message as being intended for the user.

Figure 4:
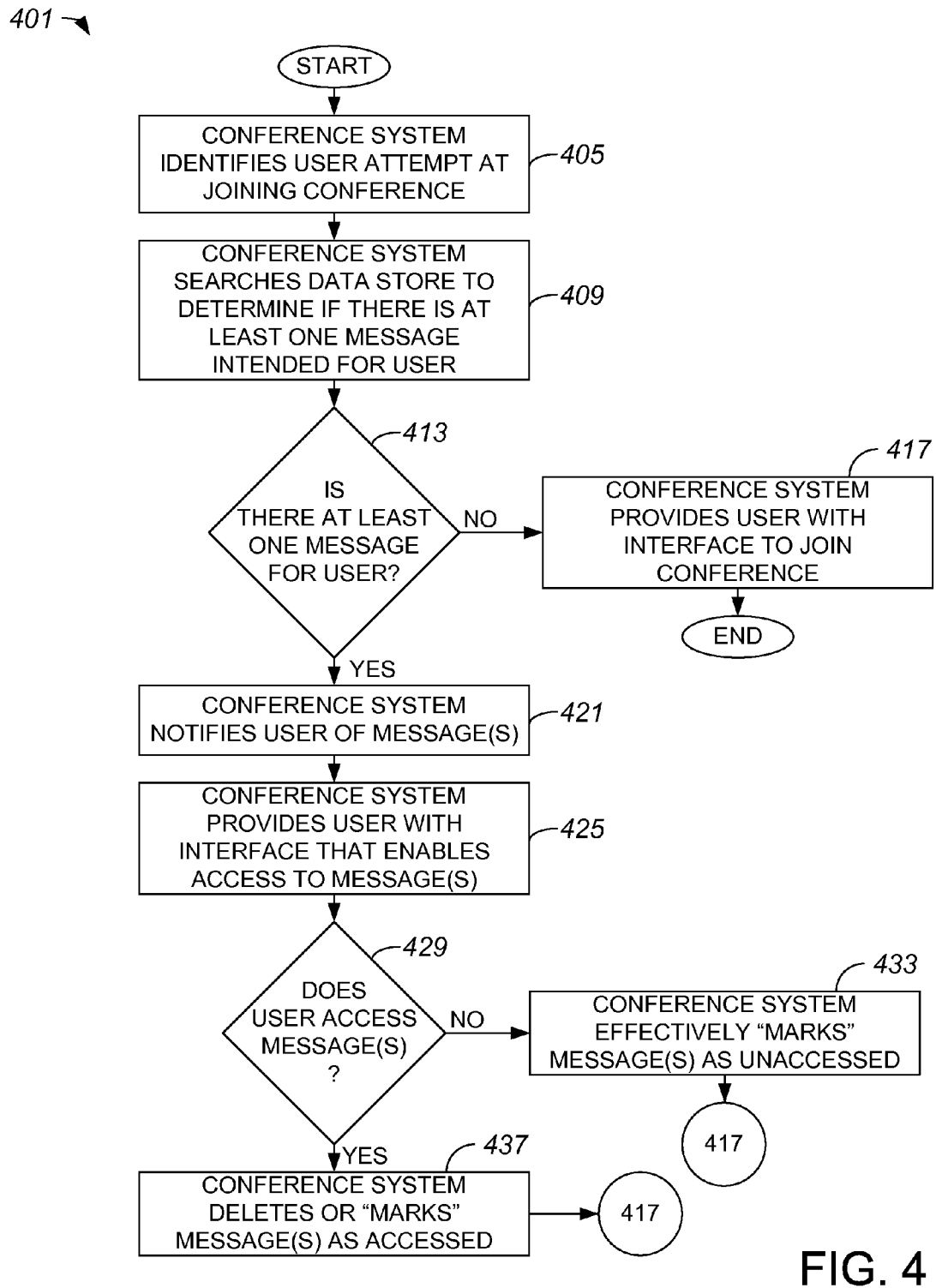
FIG. 4 is a process flow diagram which illustrates a method for determining whether to present a message to a user who is attempting to join a conference in accordance with an embodiment of the present invention.

When a user accesses a conference system, the conference system may generally identify the user, and determine whether there is a message intended for the user. If there is a message intended for the user, the conference system may present the message to the user. FIG. 4 is a process flow diagram which illustrates a method for determining whether to present a message to a user who is attempting to join a conference in accordance with an embodiment of the present invention. A process 401 of determining whether to present a message to a user begins at step 405 in which a conference system identifies an attempt by the user to join a conference. The conference system may determine that a user is attempting to join a conference, for example, by prompting the user to provide identifying information. It should be appreciated, however, that substantially any method may be used by the conference system to identify a user attempt at joining a conference. For example, the user may be identified through the use of a caller identifier (ID) feature, a phone number from which the user is calling, or a unique login number.

After the conference system identifies the user attempt at joining a conference, the conference system searches a data store in step 409 to determine if there is at least one message intended for the user. It should be appreciated that more than one message, e.g., messages from multiple sources or message originators, may be intended for the user. Searching a data store may include indexing into a data structure such as a table to search for any messages that are identified as being intended for the user. In one embodiment, substantially only messages in the data store which are effectively identified as being "unaccessed" are searched for. Unaccessed messages are those which the intended user has not accessed, although unaccessed messages may include both messages which the user does not already know about and messages whose existence the user has previously been informed of. In another embodiment, the user may be presented substantially only with a request to hear urgent messages before joining a conference. In yet another embodiment, a substantially new class of messages may be created, i.e., messages which effectively must be heard prior to joining a conference. In such an embodiment, substantially only relevant messages of the new class may be presented to a user prior to enabling him or her to join the conference.

A determination is made in step 413 as to whether at least one message for the user has been located. That is, it is determined whether there is at least one message for the user. If it is determined that there are no messages intended for the user, then the conference system provides the user with an interface in step 417 that enables the user to join a conference or otherwise access a conference bridge. The process of determining whether to present a message to the user is completed once the user is provided with an interface that enables him or her to join a conference.

Returning to step 413, if it is determined that there is at least one message intended for the user, then the conference system notifies the user of the existence of the message or messages in step 421. In the described embodiment, the user is notified of the existence of at least one message and any messages that are intended for the user are not substantially automatically presented to the user. It should be appreciated, however, that in alternate embodiments, any messages intended for the user may be substantially automatically presented, e.g., a user may effectively be forced to obtain the contents of any messages.

Once the conference system notifies the user of any messages, the conference system provides the user with an interface that enables access to the messages in step 425. For ease of discussion, it is assumed that there is a single message for the user. However, it should be understood that there may be more than a single message for the user. The user may be prompted to provide a password or other key before being allowed to access the message.

From step 425, process flow proceeds to step 429 in which it is determined whether the user has used the interface to access the message. If it is determined that the user has not accessed the message, the conference system marks the message as being unaccessed in step 433. In the described embodiment, the user is allowed to join a conference as long as he or she has been informed of the existence of the message. As such, after the message is identified as being unaccessed, process flow moves to step 417 in which the conference system provides the user with an interface that may be used to allow the user to join the conference. However, in some instances, the user may effectively be blocked from joining a conference unless he or she actually accesses, e.g., listens to or views, the message.

Alternatively, if it is determined in step 429 that the user has accessed the message, then the conference system may either delete the message or effectively mark the message as being accessed in step 437. After the message is either deleted or marked as being accessed, the conference system provides the user with an interface that enables him or her to join a conference.

Figure 5:
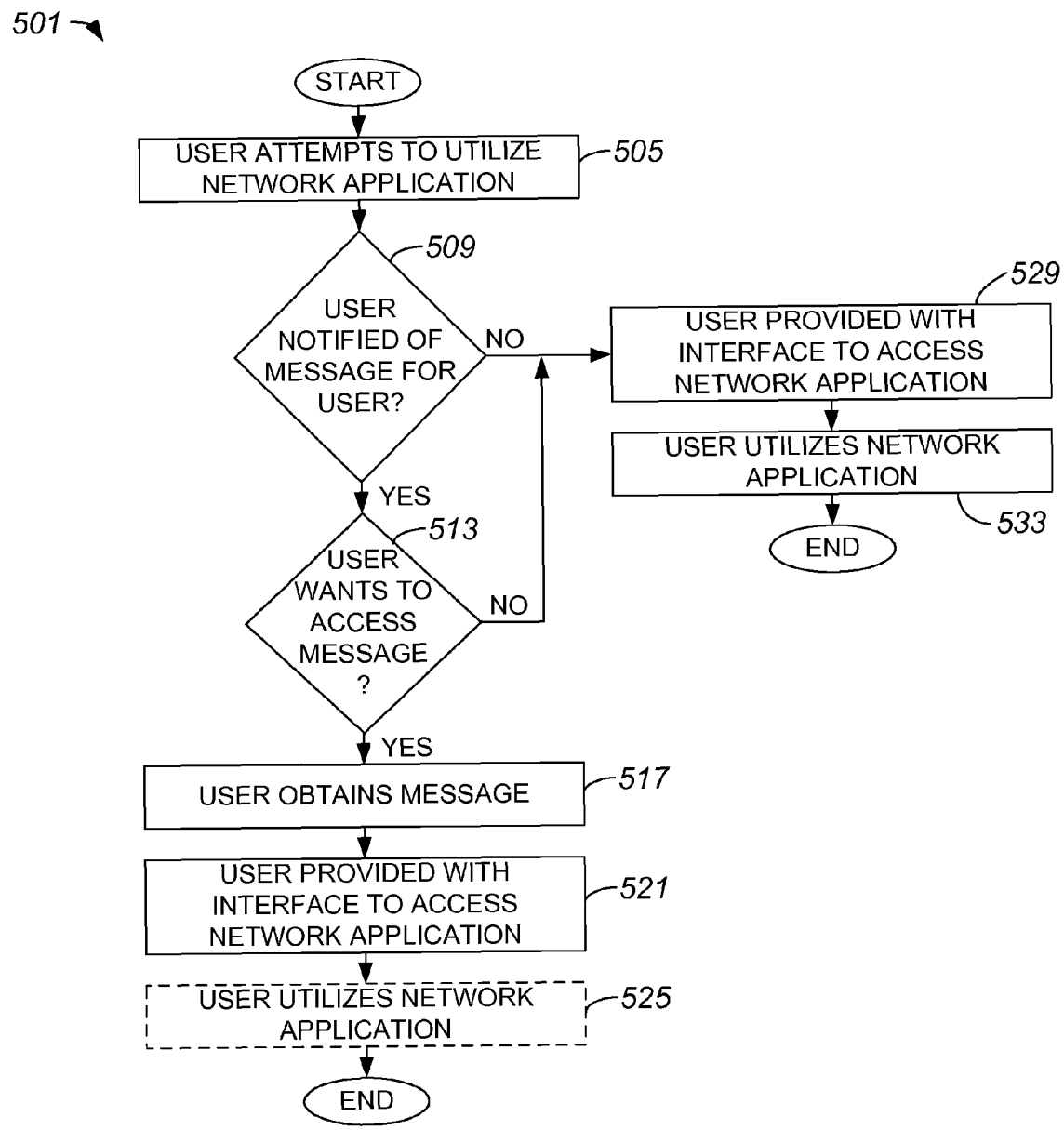
FIG. 5 is a process flow diagram which illustrates a method of accessing a network application in accordance with an embodiment of the present invention.

In general, as previously discussed, a user may be notified of a message intended for him or her when the user requests access to substantially any one of a plurality of applications within a network. FIG. 5 is a process flow diagram which illustrates a method of accessing a network application in accordance with an embodiment of the present invention. A process 501 of accessing a network application begins at step 505 in which a user, or a message recipient, requests access to a network application or attempts to utilize a network application. The network application may be substantially any application that is accessible through a network.

A determination is made in step 509 regarding whether the user has a message intended for him or her. If it is determined that the user does not have a message intended for him or her, then in step 529, the user is provided with an interface that allows him or her to access the network application. The network application may be, for example, a conference application, an instant messaging application, a chat room application, an e-mail server, or a router configuration. Once the user is provided with the interface, the user may utilize the network application in step 533. The process of accessing a network application is completed after the user utilizes the network application.

Returning to step 509, if it is determined that the user has a message, it is determined in step 513 whether the user wants to access the message. In the described embodiment, the user has a choice whether or not to access the message. It should be appreciated, however, that in another embodiment, a user may effectively be required to access the message.

If it is determined that the user does not want to access the message, the user is provided with an interface that allows him or her to access the network application in step 529. Alternatively, if the user wants to access the message, the user then obtains the message in step 517. That is, the user is presented with the message such that he or she may obtain the contents or information contained in the message. The message is typically presented in a format that is suitable for the network application, although the message may generally be presented in substantially any format.

After the user obtains the message, the user is provided with an interface that allows access to the network application in step 521. Then, in step 525, the user may optionally utilize the network application. The user may elect to utilize the network application, or the user may elect not to utilize the network application. For example, the user may elect not to utilize the network application if the message essentially informs the user that he or she need not utilize the network application. The process of accessing a network application is completed after the user is provided with an interface that enables access to the network application, or after the user optionally utilizes the network application.

Figure 6:
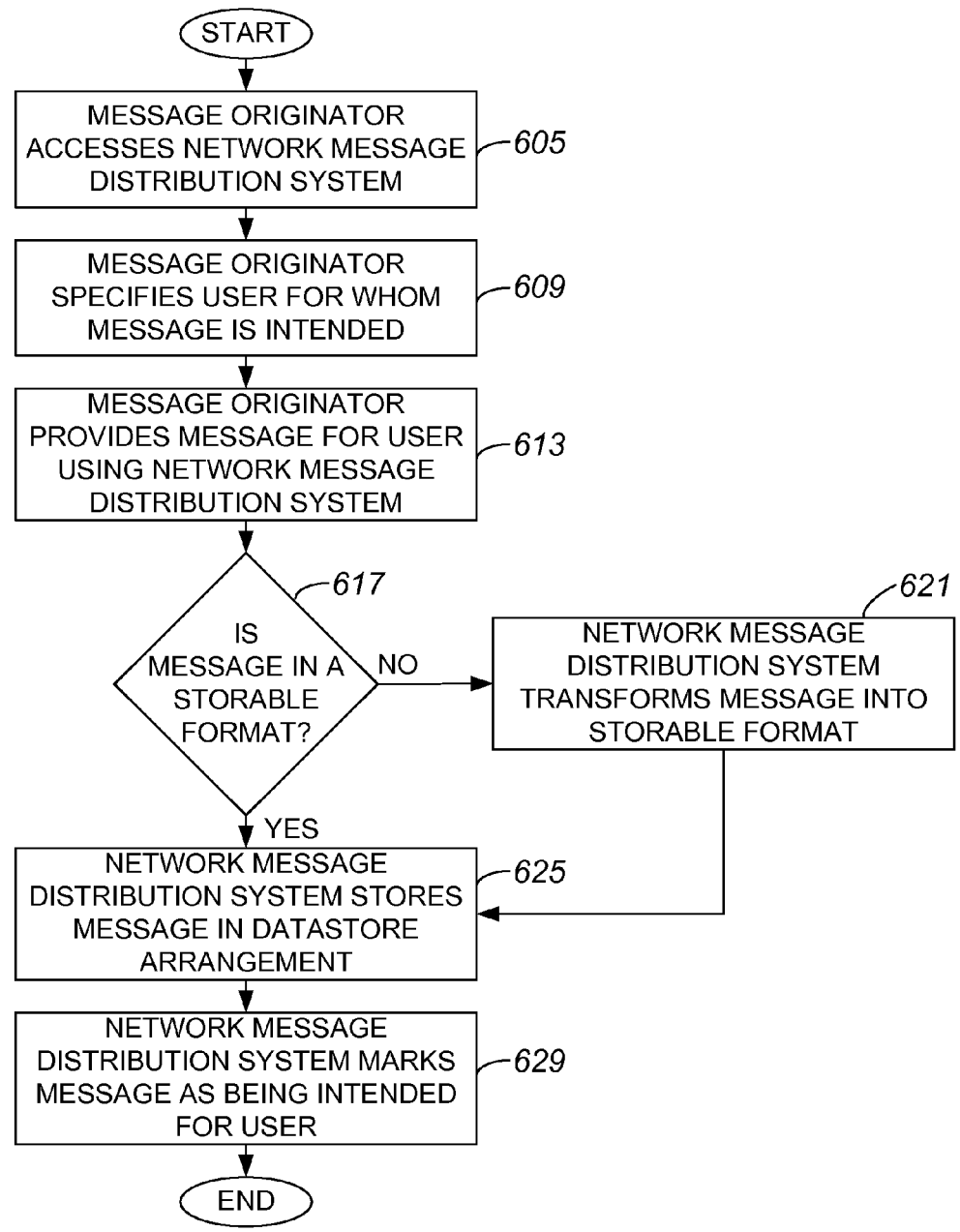
FIG. 6 is a process flow diagram which illustrates a method of processing a message for a user within an overall network system in accordance with an embodiment of the present invention.

FIG. 6 is a process flow diagram which illustrates a method of processing a message for a user within an overall network system in accordance with an embodiment of the present invention. A method 601 of processing a message for a user begins at step 605 in which a message originator accesses a network message distribution system. A network message distribution system may include a datastore arrangement such as a database in which a message may be stored, and functionality that enables applications within a network to access the message, transform the message into an appropriate format, and allow the message to be presented to an intended message recipient or user. The network message distribution system may be an interoperability server that allows the message to be presented to the user regardless of which network application the user accesses. The message originator may access the network message distribution system, for instance, by accessing a network application such as a conference application. By way of example, a message originator may access a conference application to leave a message that may then be obtained by the intended user when he or she accesses a chat room application.

In step 609, the message originator specifies the user for whom the message is intended. The message originator may be presented with a menu that allows an identifier associated with the user to be selected, or the message originator may be presented with an interface that allows the message originator to provide a user identifier. Once the user is specified by the message originator, the message originator provides a message for the user in step 613 using the network message distribution system. The message may be provided in a variety of different formats including, but not limited to including, an audio format, a video format, and/or a text format.

The format in which the message is provided may be transformed prior to the message being stored. By way of example, if a voice message may not be stored, the voice message may be transformed or converted into a text message for storage purposes. A determination is made in step 617 as to whether the message is in a storable format. If the message is determined to be in a storable format, then the network message distribution system stores the message in a datastore arrangement in step 625. Upon storing the message, the network message distribution system may effectively mark the message as being intended for the user in step 629. The method of processing the message is completed after the message is marked as being intended for the user.

Alternatively, if it is determined in step 617 that the message is not in a storable format, the implication is that the message is to be transformed prior to storing the message. As such, process flow moves from step 617 to step 621 in which the network message distribution system transforms the message into a storable format. After the message is transformed into a storable format, process flow proceeds to step 625 in which the network distribution system stores the message in a datastore arrangement. Although the above discussion describes an embodiment in which the format of messages intended for a user are substantially normalized before being stored, those of skill in the art will recognize that the present invention also covers a case in which original messages are effectively stored as is, where the normalization action may be taken by the overall system when the user attempts to retrieve the message.

Figure 7A:
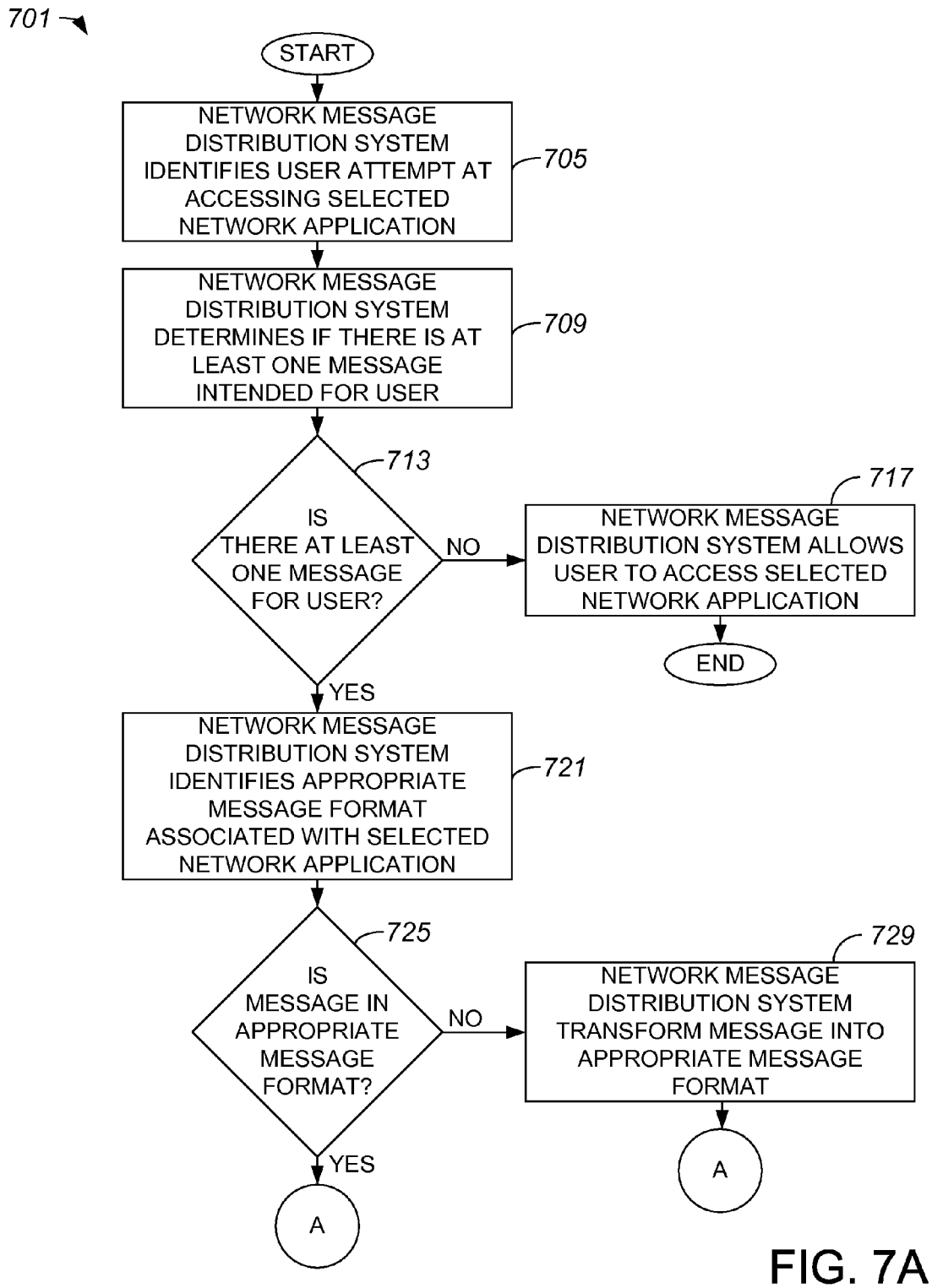
FIGS. 7A and 7B are a process flow diagram which illustrate a method of providing a message for an intended user in accordance with an embodiment of the present invention.
Figure 7B:
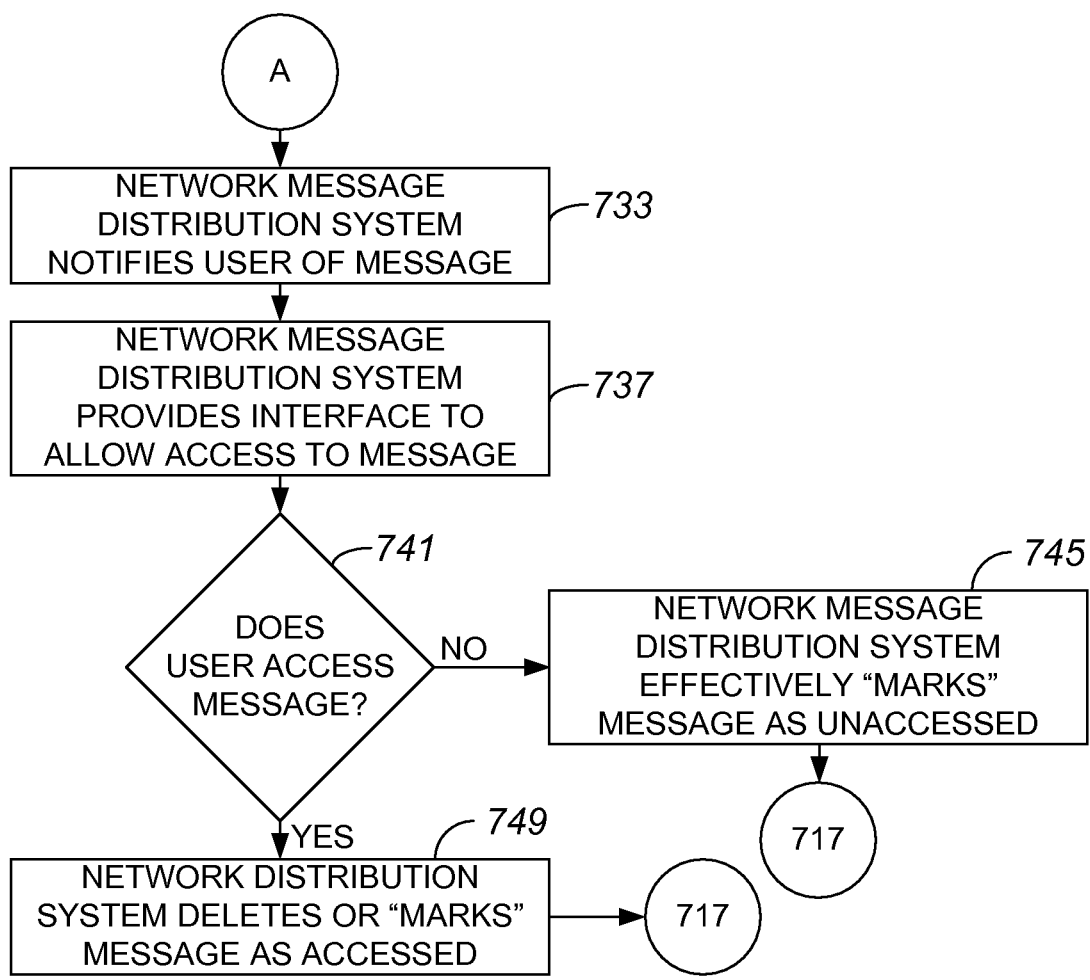

A network message distribution system is typically arranged to present a message intended for a user to the user when the user requests access to a network application. FIGS. 7A and 7B are a process flow diagram which illustrate a method of providing a message to an intended user in accordance with an embodiment of the present invention. A process 701 of providing a message to an intended user begins at step 705 in which a network message distribution system identifies a request or an attempt by a user to access a selected network application. More generally, the network message distribution system may sense the presence of the user within a network. Once a request or an attempt is detected, the network message distribution system determines if there is at least one message intended for the user in step 709. Such a determination may include, but is not limited to including, searching a datastore arrangement to identify whether there are any messages marked as being intended for the user. In one embodiment, substantially only those messages indicated as being unaccessed, i.e., substantially only those messages of which the user has not been informed, are identified.

It is determined in step 713 whether there is at least one message for the user. If the determination is that there are no messages for the user, then the network message distribution system allows the user to access the selected network application in step 717 and the process of providing a message to an intended user is completed.

Alternatively, if there is a message for the user, process flow moves from step 713 to step 721 in which the network message distribution system identifies an appropriate message format associated with the selected network application. An appropriate message format may be a message format that the selected network application is configured to render. By way of example, in a conference application, an appropriate message format may be an audio message format. In one embodiment, an appropriate message format may be a format that is associated with the user or otherwise a preference of the user. For instance, a user may specify in the network message distribution system that he or she prefers messages to be rendered as audio or voice messages.

Once an appropriate message format is identified, it is determined in step 725 whether the message is in an appropriate message format. If it is determined that the message is in an appropriate message format, the network message distribution system notifies the user of the existence of the message in step 733. Such a notification may include presenting the message to the user, e.g., playing a recorded message for the user or displaying a text message for the user, or providing the user with an indication of the existence of the message. In the described embodiment, the user may be provided with an indication of the existence of the message.

The network message distribution system provides an interface in step 737 that allows the user to access the message. It is then determined in step 741 whether the user accesses the message. Accessing the message may include playing back the message or displaying the message such that the message may be viewed. If it is determined that the user has accessed the message, the network distribution system may delete or otherwise effectively mark the message as being accessed in step 749. After the message is deleted or otherwise effectively marked as accessed, the network message distribution system allows the user to access the selected network application in step 717.

Alternatively, if it is determined in step 741 that the user does not access the message, the network message distribution system effectively marks the message as unaccessed. In one embodiment, the user is allowed to access the selected network application as long as he or she is made aware of the message, even if he or she declines to access the message. As such, process flow moves from step 745 to step 717 in which the network message distribution system allows the user to access the selected network application. It should be appreciated, however, that in some cases, a user may be prevented from accessing the selected network application unless the user actually accesses the message.

Returning to step 725 and the determination of whether the message is in an appropriate message format, if it is determined that the message is not in an appropriate message format, the indication is that the message is to be transformed into an appropriate message format. Accordingly, process flow moves from step 725 to step 729 in which the network message distribution system transforms the message into an appropriate message format. Then, process flow moves to step 733 in which the network message distribution system notifies the user of the existence of the message.

Figure 8:
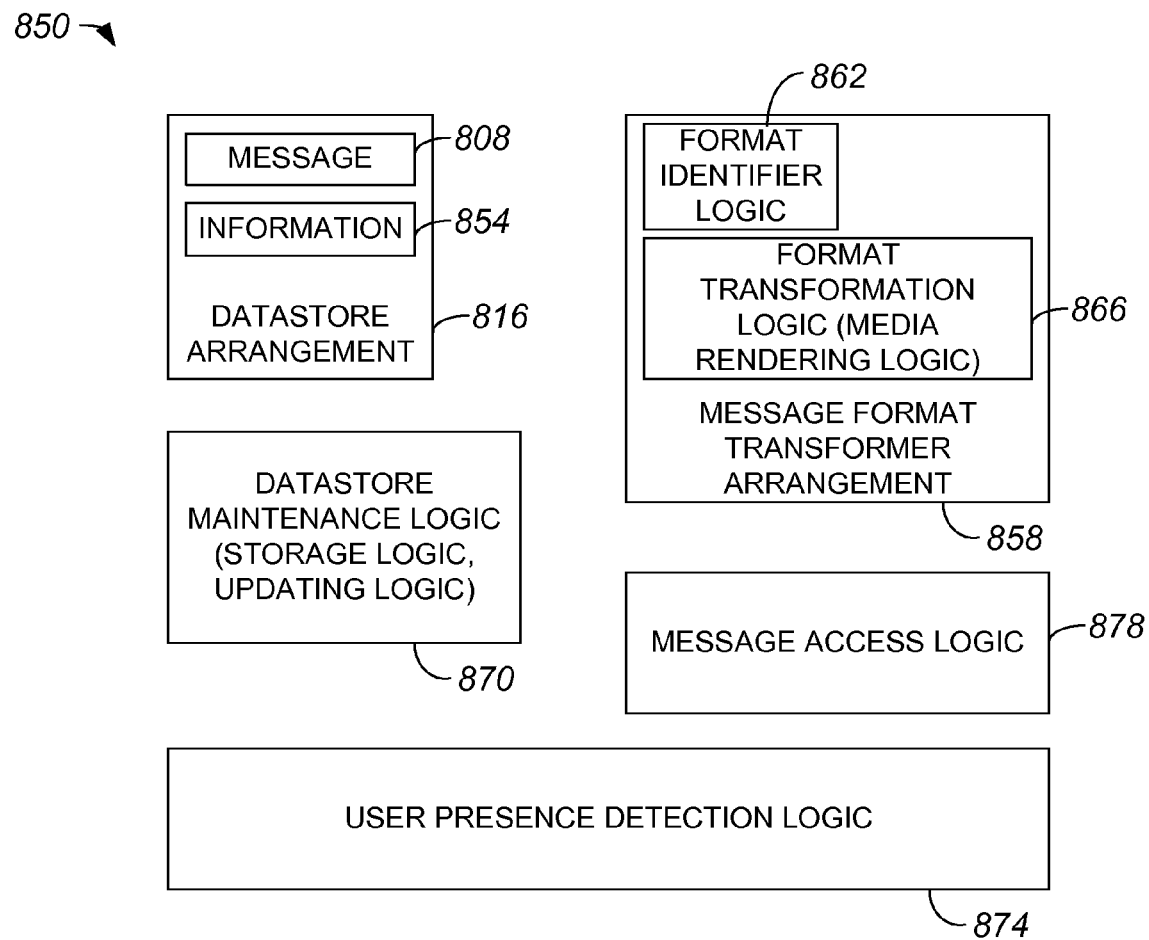
FIG. 8 is a block diagram representation of a network message distribution system in accordance with an embodiment of the present invention.

FIG. 8 is a block diagram representation of a network message distribution system in accordance with an embodiment of the present invention. A network message distribution system 850 includes hardware and/or software logic that is embodied in a tangible media. Network message distribution system 850 may be distributed throughout a network, or may be embodied as an interoperability server that is accessible to multiple applications associated with a network. Network message distribution system 850 includes a datastore arrangement 816 within which a message 808 may be stored. Information 854 associated with message 808 may also be stored in datastore arrangement 816. Information 854 may include, but is not limited to including, an indication of an intended recipient of message 808, an indication of an originator of message 808, a format of message 808, a message priority indicator, a message urgency indicator, and an indication of whether message 808 has been accessed.

Datastore maintenance logic 870 is configured to store data into datastore arrangement 816, and to update information 854 as appropriate. User presence detection logic 874 is configured to determine when a user is attempting to access a selected network application (not shown). Message access logic 878 may be configured to search datastore arrangement 816 to locate message 808, and to allow a user to access message 808. Functionality that enables a user to be notified of the existence of message 808 may also be included in message access logic 878.

Network message distribution system 850 also includes a message format transformer arrangement 858. Message format transformer arrangement 858 is generally configured to transform message 808 into an appropriate format, if necessary or desired, that may be presented to a user using a network application (not shown). Message format transformer arrangement 858 includes format identifier logic 862 which identifies appropriate message formats for use with network applications supported by network message distribution system 850. Format identifier logic 862 may also include an indication of user preferences for particular formats. Message format transformer arrangement 858 also includes format transformation logic 868, or media rendering logic, which transforms the format associated with message 808. It should be appreciated that the format associated with message 808 may be transformed prior to and/or after message 808 is stored in datastore arrangement 816.

Although only a few embodiments of the present invention have been described, it should be understood that the present invention may be embodied in many other specific forms without departing from the spirit or the scope of the present invention. By way of example, while a user may be presented with a message or otherwise informed of the existence of a message upon attempting to join a conference, a user may instead be presented with the message or otherwise informed of the message after joining a conference. In other words, a message may be played or displayed for a user at substantially any time after the user accesses an application, e.g., a conference application.

It should be appreciated that any given user may have more than a single message left for him or her. For an embodiment in which more than one message is left for a user, the user may effectively be required to access all messages before being allowed to access an application, e.g., before being allowed to join a conference. Alternatively, the user may be allowed access to the application if he or she accesses only a single message of multiple messages. In such an embodiment, the unaccessed messages may continue to be identified as being "unaccessed" and, hence, the user may be notified of those messages the next time the user attempts to access the application.

A message originator may specify a duration for a message. That is, a message originator may specify a time period for which a message is relevant. By way of example, a message originator who leaves a message for a target user in a conference application may specify that the message is substantially only relevant until a particular conference takes place. After the particular conference takes place, the message may be deleted, may be provided to a voicemail box, and/or may be provided to an e-mail box of the user. Hence, if the user accesses the conference system after the particular conference takes place, the message will no longer be played. Alternatively, the target user may be provided with an option at the time he or she is notified of the existence of the message to either save the message or to delete the message. If the target user elects to save the message, the message may be provided to a voicemail box and/or an e-mail box of the user.

Additionally, a message originator may specify that a particular message is urgent, as discussed above. In one embodiment, substantially only urgent messages may be presented to an intended user when he or she attempts to access a network application. In such an embodiment, non-urgent messages may be provided to a voicemail inbox or an e-mail inbox of the intended user without departing from the spirit or the scope of the present invention.

A message originator may also specify whether a message for a user is private, or contains sensitive information that is not intended to be shared by the target user. If a message is private, the user may be alerted that the message is private such that he or she may elect not to accept the message or to suppress the presentation of the message if he or she is in a relatively public area. To access a message that is effectively marked as being private, the user may be expected to provide a password or a key before being allowed to access the message. Alternatively, the user may be expected to verify that he or she is at a location in which the privacy of the message is unlikely to be compromised.

In one embodiment, a message originator may send an e-mail to a particular port associated with a conferencing system. The e-mail may contain specific metadata that is arranged to effectively inform the conferencing system that the message originator wishes for a particular user to be presented with the contents of the e-mail before the user joins a conference. Presenting the particular user with the contents of the e-mail may include providing the user with the e-mail to read, or rendering the contents of the e-mail into audio that may be played for the user.

An instant messaging application, or instant messaging functionality, may be integrated with a conferencing system. By way of example, a message originator may send an instant message that contains specific metadata to a certain port associated with a conferencing system. The specific metadata may specify that information contained in the instant message is intended for a particular user. The conferencing system may parse the specific metadata such that when the particular accesses the conferencing system, the instant message may be rendered to the user via an instant messaging client if the user is online, or rendered from text into audio if the user is dialed into the conferencing system.

Within a network in which a message may be retrieved upon an attempt to access substantially any application, a message originator may specify that a particular message is only to be retrieved when access to a particular application is attempted. For instance, an urgent message which indicates that a user is not needed on a conference call may effectively be marked as only being presented to the user if the user accesses a conference application, Hence, if the user accesses an instant messaging application, the urgent message is not presented to the user.

The steps associated with the methods of the present invention may vary widely. Steps may be added, removed, altered, combined, and reordered without departing from the spirit of the scope of the present invention. For example, if there are multiple messages that a user may potentially access when he or she attempts to join a conference, the user may be prevented from joining a conference unless he or she listens to all the messages. Alternatively, a user may be allowed to join a conference as long as he or she accesses a predetermined number of the messages. In one embodiment, a user may be required to retrieve substantially only messages which are marked as urgent before being allowed to gain access to a desired network application. Therefore, the present examples are to be considered as illustrative and not restrictive, and the invention is not to be limited to the details given herein, but may be modified within the scope of the appended claims.

What is claimed is:

1. A method of operating a message distribution system, the message distribution system including a database, the method comprising:
   determining when a first user has requested access to a first application, the first application being one of a plurality of applications;
   determining if there is a message for the first user when it is determined that the first user has requested access to the first application, the message being stored on the database, the database being associated with a network system, the message being accessible through each application of the plurality of applications;
   informing the first user of the message if it is determined that there is the message for the first user; and
   providing the first user with access to the first application after informing the first user of the message, wherein providing the first user with access to the first application occurs after the first user has acknowledged that the first user has been informed of the message.

2. The method of claim 1 wherein informing the first user of the message includes presenting the message to the first user if there is a message for the first user.

3. The method of claim 2 wherein providing the first user with access to the first application after informing the first user of the message includes providing the first user with access to the first application after presenting the message to the first user.

4. The method of claim 2 wherein presenting the message to the first user includes one selected from the group including playing an audio file, playing a video file, and displaying a text file.

5. The method of claim 1 wherein the first application is a conference bridge application, and providing the first user with access to the first application includes allowing the first user to join a conference using the conference bridge.

6. The method of claim 1 wherein the plurality of applications is associated with a network.

7. The method of claim 1 further including:
   providing the first user with access to the first application if it is determined that there is no message for the first user.

8. The method of claim 1 wherein the message for the first user is designated as a private message, and the method further includes:
   verifying whether the first user is in a place in which privacy associated with the private message is not compromised, wherein providing the first user with access to the first application after informing the first user of the message includes allowing the first user to join a conference using a conference bridge after verifying that the first user is in the place in which the privacy associated with the private message is not compromised.

9. Logic embodied on a non-transitory computer-readable medium for execution and when executed operable to:

determine when a first user has requested access to a first application;

determine if there is a message for the first user when it is determined that the first user has requested access to the first application;

inform the first user of the message if it is determined that there is the message for the first user; and provide the first user with access to the first application after informing the first user of the message after the first user has acknowledged that the first user has been informed of the message.

10. The logic of claim 9 wherein the logic operable to inform the first user of the message is further operable to present the message to the first user if there is a message for the first user.

11. The logic of claim 10 wherein the logic operable to provide the first user with access to the first application after informing the first user of the message is further operable to provide the first user with access to the first application after presenting the message to the first user.

12. The logic of claim 10 wherein the logic operable to present the message to the first user includes one selected from the group including logic operable to play an audio file, logic operable to play a video file, and logic operable to display a text file.

13. The logic of claim 9 wherein the first application is a conference bridge application, and the logic operable to provide the first user with access to the first application is further operable to allow the first user to join a conference using the conference bridge.

14. The logic of claim 9 wherein the first application is one of a plurality of applications associated with a network.

15. The logic of claim 10 further operable to provide the first user with access to the first application if it is determined that there is no message for the first user.

16. The logic of claim 9 wherein the message for the first user is designated as a private message, and the logic is further operable to verify whether the first user is in a place in which privacy associated with the private message is not compromised, and wherein the logic operable to provide the first user with access to the first application after informing the first user of the message is further operable to allow the first user to join a conference using a conference bridge after verifying that the first user is in the place in which the privacy associated with the private message is not compromised.

17. An apparatus comprising:
a database, the database being a tangible medium, the database being arranged to store a message intended for a target user;
a presence detection arrangement, the presence detection arrangement being arranged to identify when the target user requests access to a first application; and
a message access arrangement, the message access arrangement being arranged to notify the target user of the message, wherein the message access arrangement is further arranged to provide the target user with access to the first application after the target user is notified of the message and after the target user has acknowledged that the target user has been notified of the message.

18. The apparatus of claim 17 wherein the message access arrangement is still further arranged to present the message to the target user and to prevent the target user from accessing the first application if the message is not presented to the target user.

19. The apparatus of claim 17 wherein the first application is one selected from a plurality of applications in a network.

20. The apparatus of claim 17 further including:
datastore maintenance logic, the datastore maintenance logic being arranged to store the message in the database.

21. The apparatus of claim 17 wherein the first application is one selected from the group including a conference application, an instant messaging application, and a chat room application.

22. The apparatus of claim 17 further including:
a message format transformer arrangement, the message format transformer arrangement being configured to convert the message from a first format to a second format, the second format being associated with the first application.

23. An apparatus comprising:
means for determining when a first user has requested access to a first application, the first application being on a network that the apparatus is configured to access;
means for determining if there is a message for the first user when it is determined that the first user has requested access to the first application, the message being stored on a database;
means for informing the first user of the message if it is determined that there is the message for the first user; and
means for providing the first user with access to the first application after informing the first user of the message, wherein the means for providing the first user with access to the first application provide the first user with access after the first user has acknowledged that the first user has been informed of the message.

24. The apparatus of claim 23 wherein the means for informing the first user of the message include means for presenting the message to the first user if there is a message for the first user.

25. The apparatus of claim 24 wherein the means for providing the first user with access to the first application after informing the first user of the message include means for providing the first user with access to the first application after presenting the message to the first user.

26. A method of operating a message distribution system, the message distribution system including a database, the method comprising:
obtaining a message for a first user, the message being marked as being associated with a first application, the message being obtained from the database, the database being associated with a network system;
determining when the first user has requested access to the first application;
informing the first user of the message if it is determined that the first user has requested access to the first application; and
providing the first user with access to the first application after informing the first user of the message.

27. The method of claim 26 further including:
determining when the first user has requested access to a second application, wherein if it is determined that the first user has requested access to the second application, the first user is not informed of the message.

28. A method of operating a message distribution system, the message distribution system including a database, the method comprising:
obtaining a message for a first user, the message being obtained from the database, the database being associated with a network system;
determining whether the message is an urgent message;

determining when the first user has requested access to a first application;

informing the first user of the message if it is determined that the first user has requested access to the first application and it is determined that the message is an urgent message; and providing the first user with access to the first application after informing the first user of the message.

29. The method of claim 28 further including:

providing the message to one selected from the group including a voicemail inbox and an e-mail inbox if it is determined that the message is not an urgent message.

30. The method of claim 5 further including:

determining whether the first user has accessed the message;

removing the message from the database when it is determined that the first user has accessed the message; and identifying the message as being unaccessed when it is determined that the user has not accessed the message.

31. The method of claim 1 further including:

determining when the first user has requested access to a second application of the plurality of applications;

determining if there is the message for the first user when it is determined that the user has requested access to the second application, wherein providing the first user with access to the first application after informing the first user of the message includes providing the first user with access to the first application if it is determined that the user has requested access to the first application; and providing the first user with access to the second application after informing the first user of the message if it is determined that the user has requested access to the second application, wherein providing the first user with access to the second application occurs after the first user has acknowledged that the first user has been informed of the message.

* * * * *